(12) United States Patent
Haladu et al.

(10) Patent No.: US 9,790,296 B2
(45) Date of Patent: Oct. 17, 2017

(54) CROSS-LINKED DIALLYL QUATERNARY AMMONIUM SALT TETRAPOLYMERS AND METHODS THEREOF

(71) Applicant: King Fahd University of Petroleum and Minerals, Dhahran (SA)

(72) Inventors: Shamsuddeen Abdullahi Haladu, Khobar (SA); Shaikh Asrof Ali, Dhahran (SA); Tawfik Abdo Saleh, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 463 days.

(21) Appl. No.: 14/644,822

(22) Filed: Mar. 11, 2015

(65) Prior Publication Data

US 2016/0264690 A1   Sep. 15, 2016

(51) Int. Cl.
*C08F 26/06* (2006.01)
*C02F 1/28* (2006.01)
*C02F 101/22* (2006.01)

(52) U.S. Cl.
CPC .............. *C08F 26/06* (2013.01); *C02F 1/285* (2013.01); *C02F 2101/22* (2013.01)

(58) Field of Classification Search
CPC ..... C08F 26/06; C02F 1/285; C02F 201/2211
See application file for complete search history.

(56) References Cited

U.S. PATENT DOCUMENTS 7,238,752 B2   7/2007 Song
8,614,260 B1*  12/2013 Hamouz ................ B01J 20/267
                                                210/636
2011/0089119 A1   4/2011 Walterick, Jr. et al.

* cited by examiner

*Primary Examiner* — Taiwo Oladapo
(74) *Attorney, Agent, or Firm* — Oblon, McClelland, Maier & Neustadt, L.L.P.

(57) ABSTRACT

Cross-linked tetrapolymers made up of different diallyl zwitterionic diallyl quaternary ammonium salt monomers, with one of them functioning as a cross-linking monomer. The cross-linked terpolymers include a repeating unit with multiple ligand centers that different metal ions can bind to. The cross-linked tetrapolymers are cationic, zwitterionic and anionic, and can be in either an acidic form or a basic form. A method of removing metal ions from an aqueous solution with these cross-linked tetrapolymers is also described.

18 Claims, 6 Drawing Sheets

CROSS-LINKED DIALLYL QUATERNARY AMMONIUM SALT TETRAPOLYMERS AND METHODS THEREOF

STATEMENT OF ACKNOWLEDGEMENT

This project was funded by the National Plan for Science, Technology and Innovation (MAARIFAH)—King Abdulaziz City for Science and Technology—the Kingdom of Saudi Arabia, award number (AR-32-99).

BACKGROUND OF THE INVENTION

Technical Field

The present invention relates to cross-linked tetrapolymers. More specifically, the present invention relates to cross-linked tetrapolymers containing polymerized units of at least four different diallyl quaternary ammonium salt monomers, methods of preparing the tetrapolymers and a method of removing metal ions from an aqueous solution by adsorbing the metal ions with the tetrapolymers.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the increase of industrial activities, metal pollution may cause destructive environmental and health problems. Therefore, many approaches have been reported for the development of more effective technologies for wastewater treatment such as chemical precipitation, liquid extraction, electrodialysis, etc. [Fenglian Fu, Qi Wang, Removal of heavy metal ions from wastewaters: A review, Journal of Environmental Management 92 (2011) 407-418, Tokuyama, H., Hisaeda, J., Nii, S., Sakohara, S., Removal of heavy metal ions and humic acid from aqueous solutions by co-adsorption onto thermosensitive polymers. Sep. Purif. Technol. 71, (2010) 83-88—each incorporated herein by reference in its entirety]. Among these technologies, adsorption is considered as an efficient method for removal of pollutants in the wastewater treatment. However, the adsorption efficiency depends significantly on the nature of the adsorbent used. Numerous materials have been reported as adsorbents and classified to natural and synthetic adsorbents [George Z. Kyzas and Margaritis Kostoglou, Green Adsorbents for Wastewaters: A Critical Review, Materials 7 (2014) 333-364—incorporated herein by reference in its entirety]. However, these adsorbents have the disadvantages of low capacity, slow adsorption rate or poor recovery [Jia-Qian Jiang, S M Ashekuzzaman, Development of novel inorganic adsorbent for water treatment, Current Opinion in Chemical Engineering, 1, 2, (2012) 191-199—incorporated herein by reference in its entirety]. Thus, the design of effective materials, including organic, inorganic and nano-scale materials, as adsorbent is highly required by water treatment agencies [Mya Mya Khin, A. Sreekumaran Nair, V. Jagadeesh Babu, Rajendiran Murugan and Seeram Ramakrishna, A review on nanomaterials for environmental remediation, Energy Environ. Sci., 2012, 5, 8075-8109; Clement Sanchez, Philippe Belleville, Michael Popall and Lionel Nicole, Applications of advanced hybrid organic-inorganic nanomaterials: from laboratory to market, Chem. Soc. Rev., 2011, 40, 696-753—each incorporated herein by reference in its entirety].

Chromium, Cr (III) is considered a metal that is toxic to the environment and several adsorbents have been reported for its removal from wastewaters. Adsorbents such as activated carbon, synthesized zeolite, diatomite, chitosan and poly(vinyl alcohol) have been reported [Schneider, R. M., Cavalin, C. F., Barros, S. D. Adsorption of chromium ions in activated carbon. Chemical Engineering Journal, 132, (2007) 355-362; Wu, D. Y., Sui, Y. M., He, S. B., Wang, X. Z., Li, C. J., Kong, H. N., Removal of trivalent chromium from aqueous solutions by zeolite synthesized from coal fly ash. Journal of Hazardous Materials, 155, (2008) 415-423; Guru, M., Venedik, D., & Murathan, A. Removal of trivalent chromium from water using low-cost natural diatomite. Journal of Hazardous Materials, 160, (2008) 318-323; Debasish Das, M. K., Sureshkumar, K., Radhakrishnan, J., Adsorptive removal of Cr(III) from aqueous solutions using tripolyphosphate cross-linked chitosan beads. Journal of Radioanalytical and Nuclear Chemistry, 289, (2011) 275-285; Xiao Jun Zuo, Rajasekhar Balasubramanian, Evaluation of a novel chitosan polymer-based adsorbent for the removal of chromium (III) in aqueous solutions, Carbohydrate Polymers, 92, 2, (2013) 2181-2186—each incorporated herein by reference in its entirety]. However, such adsorbents have the disadvantages of long equilibrium time and low capacity. Therefore, tailoring of materials with high capacity in less time is a challenge in water treatment. Polymers are considered good candidates due to the possibility of creating active motifs on their chains and thus more feasibility for higher uptake.

In view of the foregoing, there exists a need for novel materials and compositions with high adsorption capacity for chromium and advantageously, a range of other metals, over a short equilibrium time.

BRIEF SUMMARY OF THE INVENTION

According to a first aspect, the present invention provides a cross-linked tetrapolymer comprising a repeating unit of four zwitterionic diallyl quaternary ammonium salt monomers having one of the following Formulas 1 or 2:

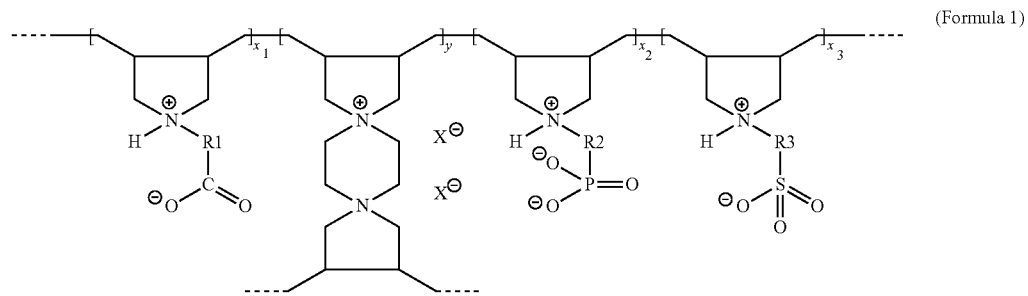

(Formula 1)

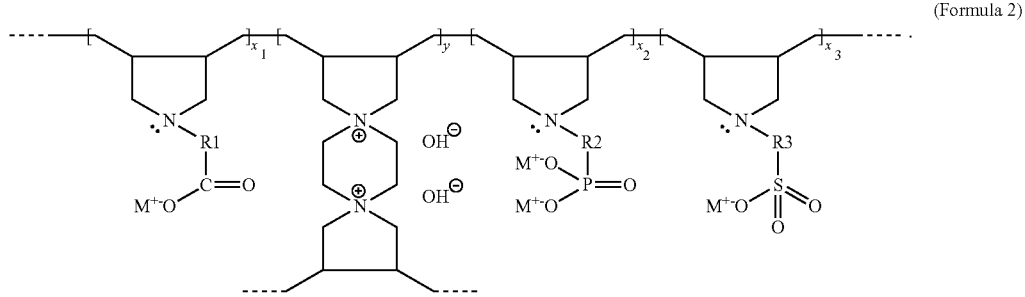

(Formula 2)

where X is F, Cl, Br, I, $NO_3$ or other suitable anion; M is Li, Na, K or other suitable cation; R1, R2 and R3 are independently substituted or unsubstituted alkyl or aryl groups having 1-6 carbon atoms. The four monomers are present in the cross-linked tetrapolymer at a molar ratio of $x_1:x_2:x_3:y$, where $x_1$, $x_2$ and $x_3$ are each 30-32, y is 4-10. The repeating unit comprises a plurality of ligand centers and one of the four monomers is a cross-linking monomer.

In one or more embodiments, the cross-linked tetrapolymer is one of cationic, zwitterionic and anionic.

In one or more embodiments, the cross-linked tetrapolymer is in an acidic form or a basic form.

In one or more embodiments, the repeating unit of the cross-linked tetrapolymer comprises at least 7 ligand centers.

In one or more embodiments, the four monomers are present in the cross-linked tetrapolymer at a molar ratio of 31:31:31:7, where the monomer having the lower number of moles is the cross-linking monomer.

In one or more embodiments, the four monomers of the cross-linked tetrapolymers are 4-(diallylammonio)butanoate, N-allyl-N-(3-phosphonopropyl)prop-2-en-1-aminum chloride, methylene 3-(diallylammonio)propane-1-sulfinate and 1,1,4,4-tetrallylpiperazine-1,4-dium chloride, with 1,1,4,4-tetrallylpiperazine-1,4-dium chloride being the cross-linking monomer.

In one or more embodiments, the cross-linked tetrapolymer is prepared by heating a solution comprising the four zwitterionic diallyl quaternary ammonium salt monomers at a molar ratio of $x_1:x_2:x_3:y$ and ammonium persulfate to 80-100° C. under an inert atmosphere, where $x_1$, $x_2$ and $x_3$ are each 30-32, y=4-10 and the monomer having the lower number of moles is the cross-linking monomer.

According to a second aspect, the present invention provides a method of removing Cr(III) ions from an aqueous solution. The method comprises contacting the aqueous solution with an adsorbent comprising the cross-linked tetrapolymer according to the first aspect of the invention.

In one or more embodiments, the Cr(III) ions have an initial concentration range of 5-500 ppm.

In one or more embodiments, the cross-linked tetrapolymer is present in a concentration range of 0.02-0.1 g $L^{-1}$ per total volume of the aqueous solution. In one or more embodiments, the contacting is carried out at a temperature of 20-65° C.

In one or more embodiments, the contacting is carried out at pH 4-7.

In one or more embodiments, the contacting is carried out for 10-120 min.

In one or more embodiments, the cross-linked tetrapolymer has a Cr(III) maximum adsorption capacity of 45-55 mg $g^{-1}$ based on the total weight of the cross-linked tetrapolymer.

In one or more embodiments, the contacting removes at least 85% of the Cr(III) ions present in the aqueous solution.

In one or more embodiments, after contacting, one or more Cr(III) ions are coordinated to the ligand centers of the cross-linked tetrapolymer.

In one or more embodiments, the method is in a batch mode.

In one or more embodiments, the method further comprises desorbing the Cr(III) from the adsorbent to regenerate the adsorbent for Cr(III) removal.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
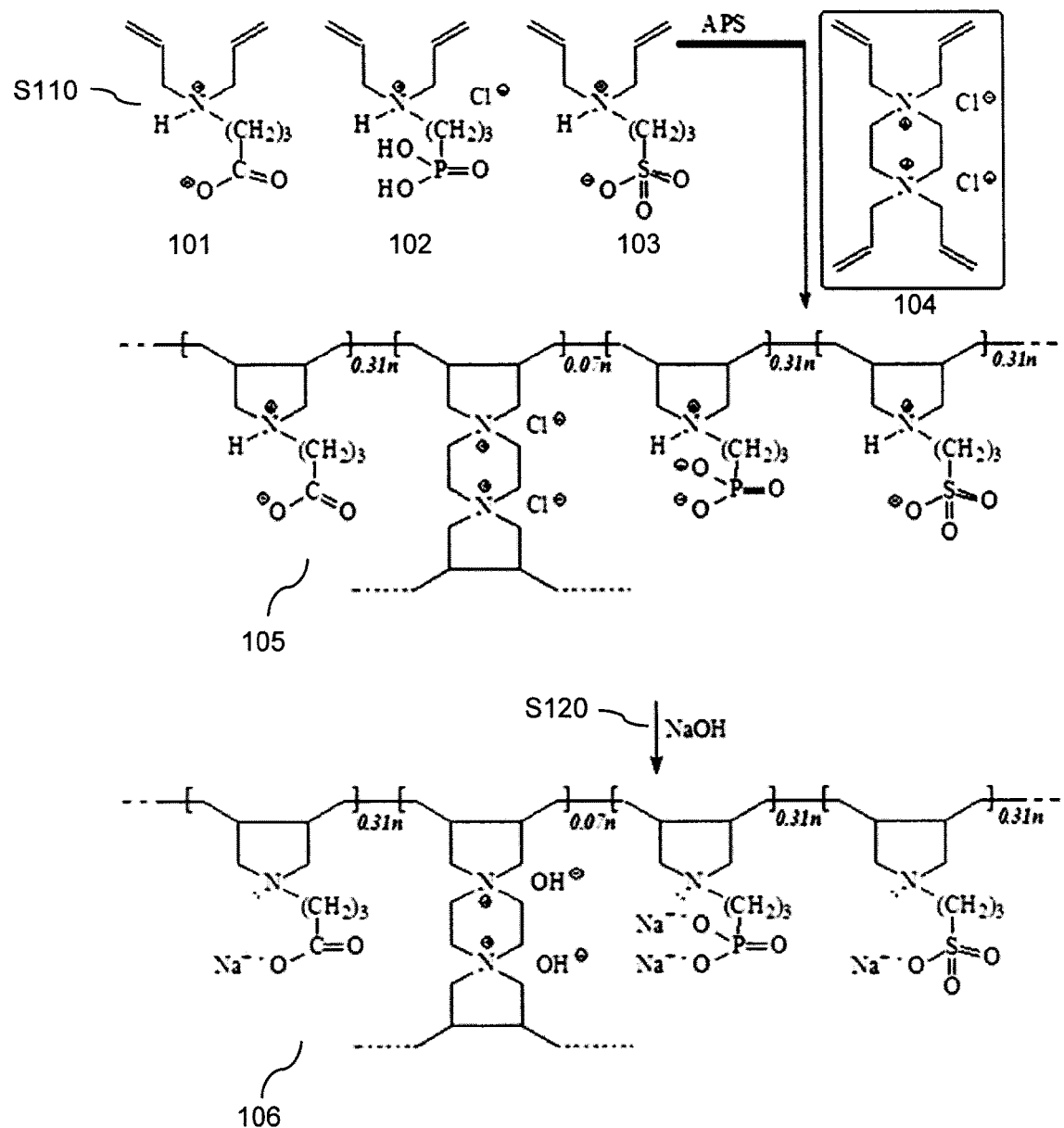
FIG. 1 is a schematic illustration of the monomers and chemical reactions involved in the synthesis of resin 105 and resin 106.

Referring now to the drawings, wherein like reference numerals designate identical or corresponding parts throughout the several views.

The present invention provides cross-linked tetrapolymers having four different polymerized diallyl quaternary ammonium salt monomers. The diallyl quaternary ammonium salt monomers are neutral and zwitterionic, wherein positive and negative electrical charges of 1-3 are present in the monomeric molecule at equal amounts.

For purposes of the present invention, "quaternary ammonium salt", which is also called "quaternary ammonium compound" or "quaternary amine", refers to a salt of quaternary ammonium cation with an anion. Quaternary ammonium cations are positively charged polyatomic ions with a generic formula of $NR_4^+$, with R being the same or different alkyl or aryl groups.

The cross-linked tetrapolymer macromolecule itself, composed of the multiple polymerized diallyl quaternary ammonium salt zwitterionic monomers, can be cationic, zwitterionic or anionic.

Additionally, the cross-linked tetrapolymer can be in an acidic form or a basic form.

In one or more embodiments, a cross-linked tetrapolymer according to the present invention comprises a repeating unit of four zwitterionic diallyl quaternary ammonium salt monomers having one of the following Formulas 1 or 2:

repetition would produce the complete polymer chain (except for the end-groups) by linking the repeat units together successively along the chain.

For purposes of the present invention, "cross-linked" or "network" or "thermoset" polymers refer to natural or synthetic polymers and resins that contain branches that connect polymer chains via covalent bonds. The cross-linking can alter the physical and mechanical properties of the polymer. The vulcanization of rubber, for example, results from the introduction of short chains of sulfur atoms that link the polymer chains in natural rubber. As the number of cross-links increases, the polymer becomes more rigid.

Cross-links can be formed by chemical reactions that are initiated by heat, pressure, change in pH, or radiation, in or without the presence of a cross-linking agent and/or a catalyst. In one or more embodiments, one of the diallyl quaternary ammonium salt zwitterionic monomers acts as a cross-linking agent and is therefore a cross-linking monomer.

In one or more embodiments, the four diallyl quaternary ammonium salt zwitterionic monomers are present in a cross-linked tetrapolymer macromolecule in a molar ratio of $x_1:x_2:x_3:y$, where $x_1$, $x_2$ and $x_3$ are each 30-32 and y is 4-10.

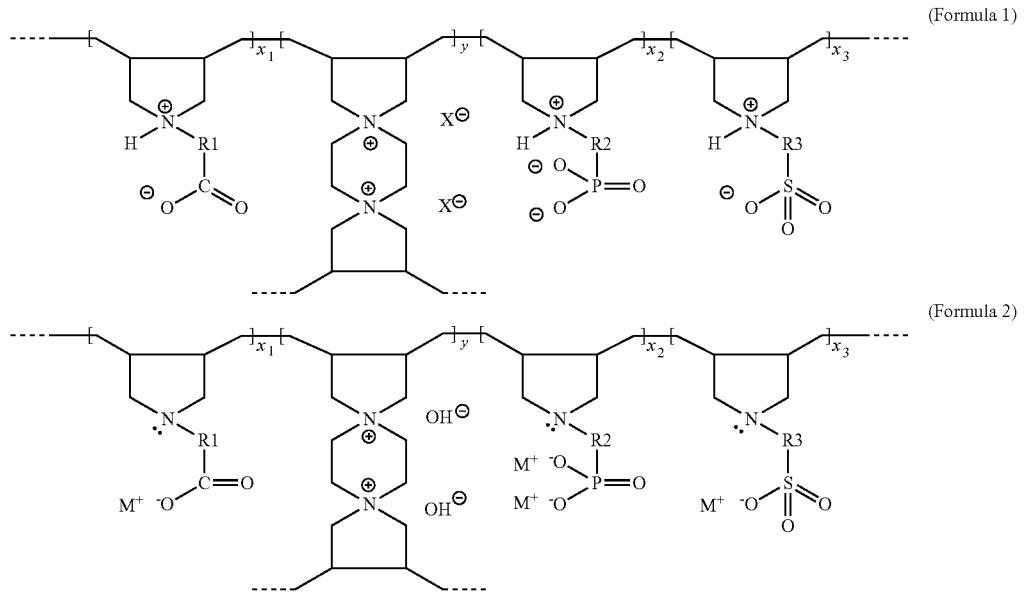

(Formula 1)

(Formula 2)

where X is F, Cl, Br, I or $NO_3$; M is Li, Na or K; R1, R2 and R3 are independently substituted or unsubstituted alkyl groups having 1-6 carbon atoms. The four monomers are present in the cross-linked tetrapolymer at a molar ratio of $x_1:x_2:x_3:y$, where $x_1$, $x_2$ and $x_3$ are each 30-32, y is 4-10. The repeating unit comprises a plurality of ligand centers and one of the four monomers is a cross-linking monomer.

The repeating unit can be repeated in the cross-linked tetrapolymer macromolecule, 10 to 10000, preferably 50 to 5000, more preferably 20 to 2500, 25 to 1500, or 100 to 1000 times.

The zwitterionic diallyl quaternary ammonium salt monomers are not necessarily in the order shown in Formulas 1 and 2. In at least one embodiment, the monomers are random and/or bond in other combinations of 4.

For purposes of the present invention, a "repeat unit" or "repeating unit" is a part of a polymer or a resin whose In one embodiment, the molar ratio is 31:31:31:7, with the monomer having the lower number of moles being the cross-linking monomer.

In one or more embodiments, the four diallyl quaternary ammonium salt zwitterionic monomers are 4-(diallylammonio)butanoate, N-allyl-N-(3-phosphonopropyl)prop-2-en-1-aminum chloride, methylene 3-(diallylammonio)propane-1-sulfinate and 1,1,4,4-tetrallylpiperazine-1,4-dium chloride in a molar ratio of $x_1:x_2:x_3:y$, where x are each 30-32 and y is 4-10. In one embodiment, the molar ratio is 31:31:31:7, with 1,1,4,4-tetrallylpiperazine-1,4-dium chloride as the cross-linking agent.

In a non-limiting example, a cross-linked tetrapolymer according to the present invention can be prepared by initially dissolving four diallyl quaternary ammonium salt monomer compounds (according to the molar ratio set forth above) in water to a final concentration of 1.5-2.0 g/mL, preferably 1.7-1.8 g/mL. A redox (or radical) initiator such as ammonium persulfate (APS), tetramethylethylenediamine (TEMED), riboflavin and TEMED, is added to the solution which is then heated under an inert atmosphere to 80-100° C. to induce cyclopolymerization of the monomers. The formed resin, which is water insoluble, is washed, filtered and dried under vacuum.

Each repeating unit in a cross-linked tetrapolymer in the present invention, as shown in Formulas 1 and 2, includes multiple ligand centers or chelating centers (i.e. central nitrogen atom of the quaternary ammonium group, $O^-$, $O^{2-}$) to which one or more metal ions can be coordinated. The metal ions that are coordinated to the plurality of ligand centers are preferably heavy metal ions, including but not limited to $Ag^+$, $Na^+$, $Pb^{2+}$, $Mn^{2+}$, $Fe^{2+}$, $Co^{2+}$, $Ni^{2+}$, $Cu^{2+}$, $Sn^{2+}$, $Cd^{2+}$, $Hg^{2+}$, $Cr^{3+}$, $Fe^{3+}$, $As^{3+}$, $Sb^{5+}$ and $Cr^{6+}$. In one embodiment, the number of ligand centers in the repeating unit is 5-9, preferably at least 7. These ligand centers exhibit different log [basicity constants] (i.e. log $K_i$) values ranging from −5.0 to 15.0, preferably −2.5 to 11.0, for example −2.1 to 10.8.

In view of the foregoing, a cross-linked tetrapolymer according to the present invention possesses adsorption capacity towards a wide range of metal ions. The present invention further provides a method of removing metal ions from an aqueous solution by adsorbing the metal ions with an adsorbent comprising at least one cross-linked tetrapolymer described herein, in both batch mode and fixed-bed or column mode. Examples of metal ions that can be adsorbed by the cross-linked tetrapolymer are outlined above.

In one embodiment, a cross-linked tetrapolymer according to the present invention is effective in removing Cr(III) ions from an aqueous solution. The initial concentration of Cr(III) ions in the aqueous solution (batch mode) is 5-500 ppm, preferably 10-100 ppm.

In one or more embodiments, the cross-linked tetrapolymer adsorbent is present in the aqueous solution within a concentration range of 0.02-0.1 g $L^{-1}$ (per volume of the treated aqueous solution).

In one or more embodiments, the aqueous solution is within a pH range of 3-7, preferably 4-7.

In one or more embodiments, a cross-linked tetrapolymer of the present invention is effective in adsorbing metal ions in an aqueous solution within a temperature of 15-100° C., preferably 20-80° C., more preferably 20-65° C.

In one or more embodiments, the adsorption of metal ions by a cross-linked tetrapolymer of the present invention in an aqueous solution is carried out for a duration of 5-180 min, preferably 10-120 min, more preferably 20-100 min. More than 80% of the metal ions present in the aqueous solution will be successfully removed at the end of the adsorption process, preferably more than 85%, more preferably more than 90%, for example, 95%. Advantageously, more than 70% of the metal ions are removed within the 30 min.

In one or more embodiments, the metal removal or adsorption process by a cross-tetrapolymer of the present invention comprises physisorption and chemisorption.

In one or more embodiments, the metal removal or adsorption process by a cross-tetrapolymer of the present invention consists essentially of phyisorption.

In one or more embodiments, the cross-linked tetrapolymer has a Cr(III) maximum adsorption capacity of 40-60 mg $g^{-1}$ based on the total weight of the cross-linked tetrapolymer, preferably 45-55 mg $g^{-1}$, more preferably 47.5-50 mg $g^{-1}$.

A cross-linked tetrapolymer according to the present invention can be regenerated and reused as a metal adsorbent for at least 5 cycles with minimal decrease in adsorption efficiency (no more than a 2% decrease in mercury removal with each regeneration cycle). To regenerate the adsorbent, metal ions are desorbed from a cross-linked tetrapolymer and this can be achieved by treating a spent tetrapolymer resin, i.e. a metal-loaded tetrapolymer resin in an acidic or basic solution of at least 0.5 M in concentration. Strong acids and bases such as HCl, $H_2SO_4$, $HNO_3$, NaOH and KOH are preferred, but organic acids, weak acids and weak bases (e.g. acetic acid, ammonia etc.) may also be used for metal ion desorption process.

The examples below further illustrate protocols for preparing and characterizing the cross-linked tetrapolymers described herein, and are not intended to limit the scope of claims.

EXAMPLE 1

Chemicals, Materials and Equipment

The standard solutions (1000 mg/L) of chromium (III), hydrochloric acid, nitric acid and sodium hydroxide were obtained from Sigma-Aldrich. The chromium standard solution was utilized to prepare the required initial concentrations by dilution. Monomers 101, 102, 103 and 104 are synthesized using literature procedures [S. A. Ali, S. Z. Ahmed, E. Z. Hamad, cyclopolymerization studies of diallyl- and tetraallylpiperazinium salts, J. Appl. Polym. Sci. 61 (1996) 1077-1085; Kudaibergenov S, Jaeger W, Laschewsky A. Polymeric Betaines: Synthesis, Characterization and Application. Adv Polym Sci 2006; 201:157-224; S. A. Ali, M. A. J. Mazumder and Hasan A. Al-Muallem, "Synthesis and Solution Properties of a New pH-Responsive Polymer Containing Amino Propanesulfonic Acid Residues", J Polym Sci, Part A: Polym Chem, 41, 172-184 (2003); Singh P K, Singh V K, Singh M. Zwitterionic Polyelectrolytes: A Review. e-Polymers 2007; 030:1-34— each incorporated herein by reference in its entirety].

Scanning electron microscope (SEM) was used to determine the surface morphology of the synthesized tetrapolymers 105 and 106, before and after the adsorption of chromium. Energy-dispersive X-ray spectroscope (EDX) equipped with a detector model X-Max was utilized for elemental analysis of the polymer and Cr(III)-loaded polymer.

Cr(III) determination was carried out with a Thermo Scientific iCE 3000 flame atomic absorption spectrometer (FAAS) equipped with a 10 cm air-acetylene burner. Inductively coupled plasma mass spectrometry (ICP-MS) model ICP-MS XSERIES-II Thermo Scientific, was used to determine the concentrations of some metal ions in real wastewater samples. Thermogravimetric analysis (TGA) was performed using an SDT analyzer (Q600: TA instruments, USA). The polymer weighing≈6 mg was taken in an aluminum crucible. The temperature was raised at a uniform rate of 15° C./min. The analyses were made over a temperature range of 20-800° C. in a nitrogen atmosphere flowing at a rate of 50 cm$^3$/min. IR spectra were recorded on a Perkin-Elmer 16F PC FTIR spectrometer.

EXAMPLE 2

Synthesis of Resins 105 (CPZA 5) and 106 (CAPE 6)

Monomer compounds 101, 102 and 103 were cyclopolymerized, according to known protocols with slight modifications, in the presence of a fourth monomer compound 104 that serves as a cross-linker for the resin product 105 [Butler G B. Cyclopolymerization and cyclocopolymerization. New York: Marcel Dekker, 1992; Martinez-tapia, H. S.; Cabeza, A.; Bruque, H.; Pertierra, P.; Garcmh, S.; Aranda, M. A. G. Synthesis and structure of Na$_2$[(HO$_3$PCH$_2$)$_3$NH]1.5H$_2$O: The first alkaline triphosphate. J. Solid State Chem. 2000, 151, 122-129; Shaikh A. Ali and Shamsuddeen A. Haladu, A novel cross-linked polyzwitterion/anion having pH-responsive carboxylate and sulfonate motifs for the removal of Sr$^{2+}$ from aqueous solution at low concentrations, Reactive and Functional Polymers, 73 (2013) 796-804—each incorporated herein by reference in its entirety]. The presence of nitrogens having unquenched valency permitted the transformation of acidic zwitteionic resin 105 to basic resin 106 by treatment with aqueous NaOH. The resins contained a variety of ligands (i.e. chelating centers) to scavenge metal ions. pH-responsive resins provided the latitude of changing the charge types and their densities in the polymer network in cationic, zwitteionic and anionic forms, which has the potential of scavenging anions in the acidic form and cations in the basic form. As evident from the data presented in Table 1, the resins 105 and 106 provide seven basic centers having basicity constants in a wide range (–) 2.1-10.8. Resin 106 has seven chelating centers (of N and O$^-$) of differing log [basicity constants] (i.e. log $K_i$) ranging from –2.1 to 10.8 [S. A. Ali, M. A. J. Mazumder and Hasan A. Al-Muallem, "Synthesis and Solution Properties of a New pH-Responsive Polymer Containing Amino Propanesulfonic Acid Residues", J Polym Sci, Part A: Polym Chem, 41, 172-184 (2003); Shaikh A. Ali, N. Y. Abu-Thabit, Hasan A. Al-Muallem, "Synthesis and solution properties of a pH-responsive cyclopolymer of zwitterionic ethyl 3-(N,N-diallylammonio)propanephosphonate". J. Polym. Sc., Part A Polym chem. 48 (24), 5693-5703 (2010); S. A. Haladu and S. A. Ali, A pH-Responsive Cyclopolymer having phospho- and sulfopropyl pendents in the same repeating unit: Synthesis, Characterization and its application as an antiscalant, Submitted J Polym Sci, Polym Chem 2013, 51, 5130-5142; S. A. Ali, Aal-e-Ali, "Synthesis and Solution properties of a quaternary ammonium polyelectrolyte and its corresponding polyampholyte", Polymer, 42, 7961-7970 (2001); Freedman L D, Doak G O. The Preparation and Properties of Phosphonic Acids. Chem Rev. 1957; 57:479-523—each incorporated herein by reference in its entirety]. The repeating unit of monomers 101 and 103 provide two basic centers each while that of monomer 103 inserts three additional centers [I. W. Kazi, F. Rahman, and Shaikh A. Ali, Synthesis of a Polyaminophosphonate and its Evaluation as an Antiscalant in Desalination Plant, Polym Engg Sci., 54, 166-174 (2014); I. W. Kazi, S. A. Ali, Heavy metal ions extraction using a novel polyphosphonate resin. Submitted for publication; S. A. Ali, S. Z. Ahmed, E. Z. Hamad, cyclopolymerization studies of diallyl- and tetraallylpiperazinium salts, J. Appl. Polym. Sci. 61 (1996) 1077-1085; Kudaibergenov S, Jaeger W, Laschewsky A. Polymeric Betaines: Synthesis, Characterization and Application. Adv Polym Sci 2006; 201:157-224; Singh P K, Singh V K, Singh M. Zwitterionic Polyelectrolytes: A Review. e-Polymers 2007; 030:1-34; Butler G B. Cyclopolymerization and cyclocopolymerization. New York: Marcel Dekker, 1992; Martinez-tapia, H. S.; Cabeza, A.; Bruque, H.; Pertierra, P.; Garcmh, S.; Aranda, M. A. G. Synthesis and structure of Na$_2$[(HO$_3$PCH$_2$)$_3$NH] 1.5H$_2$O: The first alkaline triphosphate. J. Solid State Chem. 2000, 151, 122-129; Shaikh A. Ali and Shamsuddeen A. Haladu, A novel cross-linked polyzwitterion/anion having pH-responsive carboxylate and sulfonate motifs for the removal of Sr$^{2+}$ from aqueous solution at low concentrations, Reactive and Functional Polymers, 73 (2013) 796-804; Cabeza, A.; Ouyang, X.; Sharma, C. V. K.; Aranda, M. A. G.; Bruque, S.; Clearfield, A. Complexes formed between nitrilotris (methylenephosphonic acid) and M 2+ transition metals: Isostructural organic-inorganic hybrids. Inorg. Chem. 2002, 41, 2325-2333—each incorporated herein by reference in its entirety].

The various basic strengths of the ligand centers can be advantageously exploited in selective and efficient removal of metal ions, under a variety of conditions.

TABLE 1

Log [basicity constant] of basic centers of the repeat units of monomers 101, 102 and 103.

| Basic centers (B:)* | Log [basicity constant] of basic centers of the repeat units of | | |
|---|---|---|---|
| | monomer 101 | monomer 102 | monomer 103 |
| —N̈— | log $K_1$: 10.5 | log $K_1$: 10.5 | log $K_1$: 10.8 |
| —O$^{2-}$ | — | log $K_2$: 6.0 | — |
| —O$^-$ | log $K_1$: ≈4.0 | log $K_3$: 2.4 | log $K_2$: –2.1 |

*B: + H$^+$ $\underset{}{\overset{K}{\rightleftharpoons}}$ BH$^+$

Referring to FIG. 1, at step 110, in a round bottom flask (50 cm$^3$) fitted with a condenser, a solution of monomer compound 101 (1.83 g, 10 mmol), monomer compound 102 (2.56 g, 10 mmol), monomer compound 103 (2.19 g, 10 mmol) and monomer compound 104 (720 mg, 2.26 mmol) in water (4.1 g) was heated to 90° C. under N$_2$ and ammonium persulfate (APS) (500 mg) was added in one portion. The exothermic reaction raised the temperature of the reaction mixture to over 100° C. After stirring for an additional 20 min at 90° C., the mixture was cooled and soaked in water. The resin was filtered with water and acetone and finally dried under vacuum to a constant weight (6.6 g, 94%). In the process of soaking in large excess of water, the acidic from of the repeating unit from monomer compound 102 was transformed to a zwitterionic state because of the removal of HCl. This was supported by elemental analyses as well as by precedent literature involving a linear polyaminophosphonate [I. W. Kazi, F. Rahman, and Shaikh A. Ali, Synthesis of a Polyaminophosphonate and its Evaluation as an Antiscalant in Desalination Plant, Polym Engg Sci., 54, 166-174 (2014)—incorporated herein by reference in its entirety]. For the composition of (Found: C, 54.0; H, 8.7; N, 6.8; S, 4.2. The resin having the composition of the incorporated monomers as in resin 105 (CPZA 5) requires C, 55.10; H, 8.51; N, 6.94; S, 4.53%).

At step 120 of FIG. 1, NaOH (2.6 g, 65 mmol) was added to the acidic form of resin 105 (6.0 g, 27.9 mmol) in water (25 mL). The mixture was soaked in for 24 h at room temperature. Then, the mixture was filtered, washed with excess methanol, and dried under vacuum at 60° C. to a constant weight of resin 106 which is in basic form (6.4 g, 95%).

EXAMPLE 3

Characterization of Synthesized Resins 105 and 106

The synthesized tetrapolymers 105 and 106 were characterized using a variety of techniques, including thermogravimetric analysis (TGA) FTIR (Fourier transform infrared) spectroscopy, scanning electron microscopy (SEM) and energy-dispersive X-ray spectroscopy (EDX).

Thermogravimetric analysis (TGA) was carried out in order to evaluate the thermal stability of the synthesized tetrapolymers. The TGA curve of CAPE 6 or resin 106 (FIG. 2) showed three major loss in weight: first slow weight loss of 14% is attributed to both loss of water imbedded inside the cross-linked polymer and $SO_2$ (at ~250° C.), the second major loss of 46.7% and the third slow loss of 9.9% are the result of combustion of nitrogenated organic fraction with the release of $CO_2$, $NO_x$ and $H_2O$ gases. The residual mass at 800° C. was found to be 29.4%, which may be attributed to $Na_2O.1.5P_2O_5$ [Shaikh A. Ali and Shamsuddeen A. Haladu, A novel cross-linked polyzwitterion/anion having pH-responsive carboxylate and sulfonate motifs for the removal of $Sr^{2+}$ from aqueous solution at low concentrations, Reactive and Functional Polymers, 73 (2013) 796-804—incorporated herein by reference in its entirety].

Figure 2:
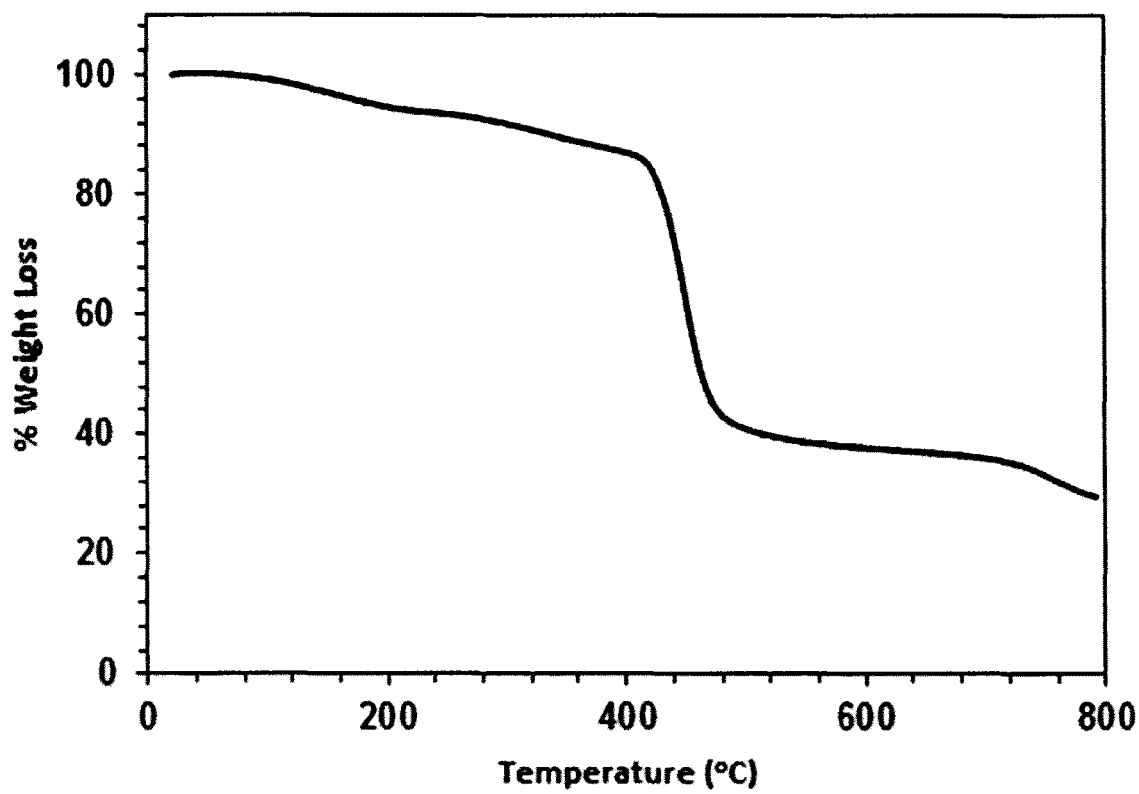
FIG. 2 shows a TGA curve of resin 106.
Figure 3:
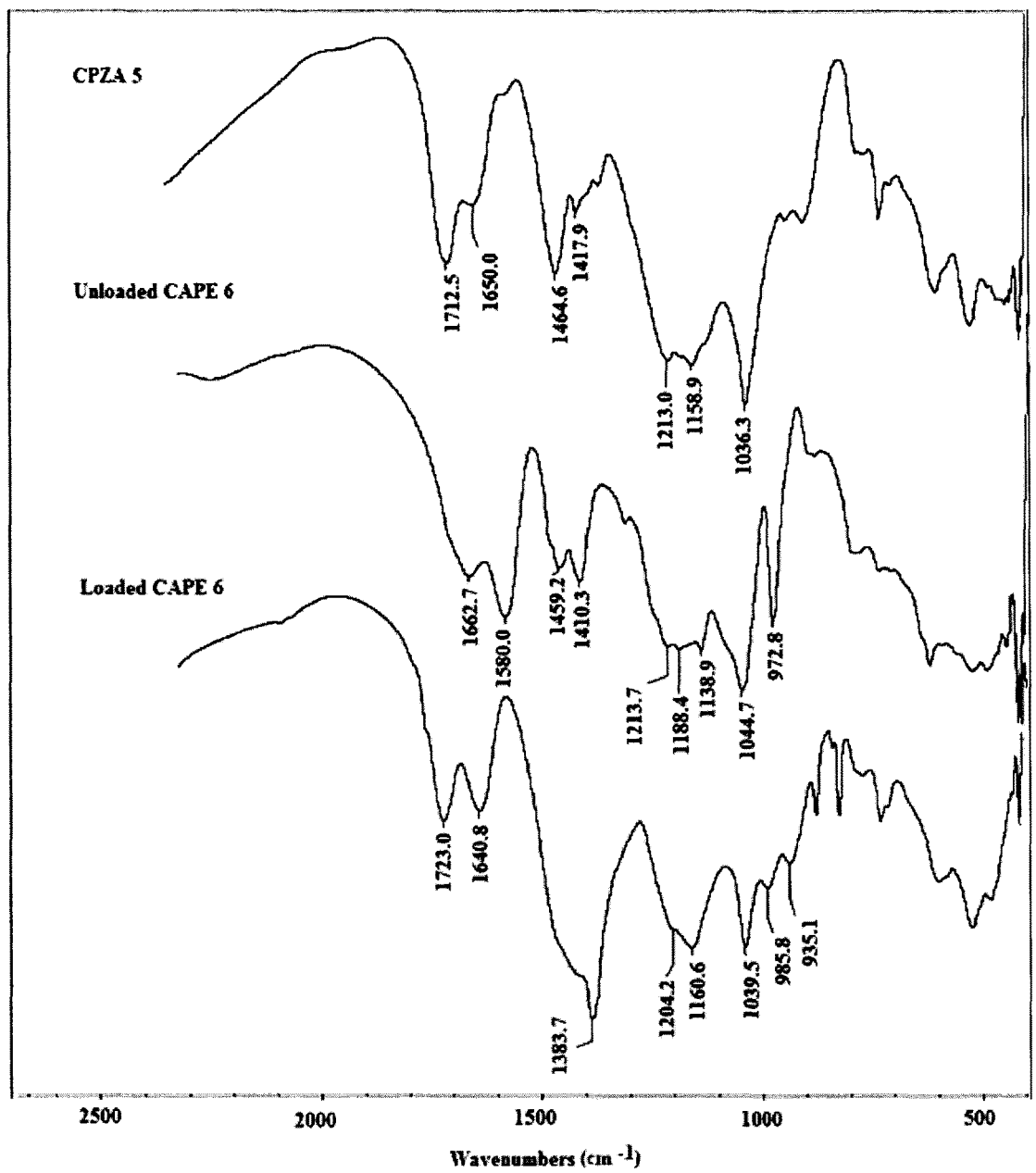
FIG. 3 shows IR spectra of resin 105, resin 106 and resin 106 loaded with Cr(III).

Referring to FIG. 3, the IR spectrum of resin 105 or CPZA 5 shows the presence of C=O of COOH at 1713 $cm^{-1}$, symmetric and anti-symmetric stretching of $COO^-$ at 1418 and 1650 $cm^{-1}$ respectively [Y. G. Zhao, H. Y. Shen, S. D. Pan, M. Q. Hu, Q. H. Xia, Preparation and characteri-zation of amino-functionalized nano-Fe3O4magnetic polymer adsorbents for removal of chromium(VI) ions, J. Mater. Sci. 45 (2010) 5291-5301—incorporated herein by reference in its entirety]. The two strong bands at 1213 and 1036 $cm^{-1}$ were assigned to the sulfonate group [Cabeza, A.; Ouyang, X.; Sharma, C. V. K.; Aranda, M. A. G.; Bruque, S.; Clearfield, A. Complexes formed between nitrilotris (methylenephosphonic acid) and M 2+ transition metals: Isostructural organic-inorganic hybrids. Inorg. Chem. 2002, 41, 2325-2333—incorporated herein by reference in its entirety]. For the spectrum of the unloaded resin 106 or unloaded CAPE 6 as shown in FIG. 2, the symmetric and antisymmetric stretching of $COO^-$ appeared at 1410 and 1663 $cm^{-1}$. The two strong bands of P—O vibrations appear within the range 900-1150 $cm^{-1}$ [Shaikh A. Ali and Shamsuddeen A. Haladu, A novel cross-linked polyzwitterion/anion having pH-responsive carboxylate and sulfonate motifs for the removal of $Sr^{2+}$ from aqueous solution at low concentrations, Reactive and Functional Polymers, 73 (2013) 796-804—incorporated herein by reference in its entirety]. The appearances of new strong bands on the spectrum of resin 106 or CAPE 6 loaded with Cr(III) at 1723 and 1384 $cm^{-1}$ are attributed to the presence of C=O of the C(=O)OH and the ionic nitrate group, respectively since the adsorption studies were performed in the presence of copper nitrates [Cabeza, A.; Ouyang, X.; Sharma, C. V. K.; Aranda, M. A. G.; Bruque, S.; Clearfield, A. Complexes formed between nitrilotris (methylenephosphonic acid) and M 2+ transition metals: Isostructural organic-inorganic hybrids. Inorg. Chem. 2002, 41, 2325-2333—incorporated herein by reference in its entirety]. The absorption band attributed to the nitrate ion is absent in the IR spectrum of the unloaded resin 106.

EXAMPLE 4

Adsorption Evaluation of Resins 105 and 106

The adsorption behaviors of synthesized tetrapolymers 105 and 106 were evaluated for the sorption of Cr(III) from aqueous solutions. A predetermined amount of adsorbent was added into 20 mL of Cr(III) solution in a plastic container. Then, the containers were placed in a bath shaker with a speed of 150 rpm until the equilibrium was reached. The effect of the temperature was investigated by adjusting the bath temperature, and thus, the solutions. The chromium-loaded polymer 106 was characterized by SEM/EDX and FTIR.

The % of removed Cr(III) ions from aqueous solution was computed using the following Equation 1:

$$\% \text{ Removal} = \frac{C_o - C_e}{C_o} \times 100 \quad (1)$$

The amounts of Cr(III) adsorbed per unit mass of the polymer at equilibrium ($q_e$, mg/g) and at any time t ($q_t$, mg/g) (adsorption capacity) were computed using the following Equations 2 and 3:

$$q_e = (C_o - C_e) \times \frac{V}{m} \quad (2)$$

$$q_t = (C_o - C_t) \times \frac{V}{m} \quad (3)$$

where $C_O$ (mg/L) is the initial Cr(III) concentration, $C_e$ and $C_t$ (mg/L) are the Cr(III) concentrations at the equilibrium liquid phase and at any time t, V (L) is the volume of the solution, and m (g) is the mass of the used polymer.

The pH value of initial Cr(III) solution is considered an important parameter in the adsorption. pH affects the surface charge of the adsorbent and the conversion of chromium species. The Cr(III) speciation is related to pH value of the solution [Y. G. Zhao, H. Y. Shen, S. D. Pan, M. Q. Hu, Q. H. Xia, Preparation and characterization of amino-functionalized nano-Fe3O4magnetic polymer adsorbents for removal of chromium(VI) ions, J. Mater. Sci. 45 (2010) 5291-5301; Vanessa C. Santos, Antonio de P. Dragunski, Highly improved chromium (iii) uptake capacity in modified sugarcane bagasse using different chemical treatments, Quim. Nova, 35, 8 (2012) 1606-1611; Janez Scancar, Radmila Milacic, A critical overview of Cr speciation analysis based on high performance liquid chromatography and spectrometric techniques, J. Anal. At. Spectrom., 2014, 29, 427-443—each incorporated herein by reference in its entirety]. The pH of the initial solutions was varied between 3.0 and 7.0. Solutions of pH>7 were not examined to avoid metal ion precipitation. The maximum % removal achieved at a range of pH 4-7.

Figure 4:
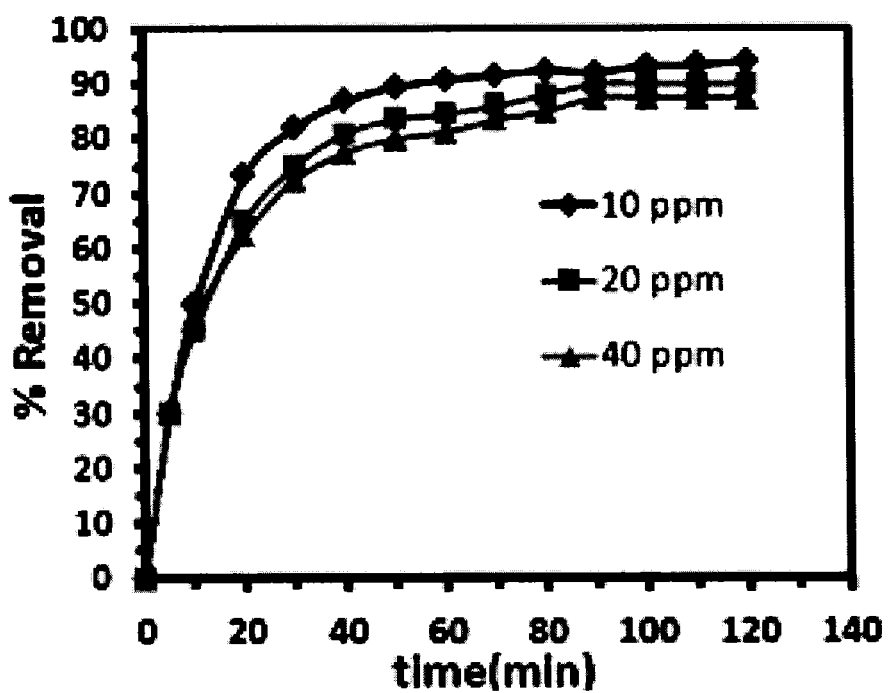
FIG. 4 illustrates the variation of adsorption % with adsorption time for adsorption of Cr(III) on the reported novel polymer for different initial feed concentrations.

The effect of contact time on the Cr(III) uptake by the polymer was investigated for an initial concentrations of 10, 20 and 40 ppm in batch experimental mode. The contact time experiments were performed at room temperature 23° C. The fast adsorption of Cr(III) ions, as shown in FIG. 4, at the initial stages can be explained by availability of the active motifs and uncovered surface of the polymer. The adsorption increased with increasing contact time till equilibrium was attained. Thereafter, increasing the contact time beyond these limits has no considerable enhancement on the adsorption percentage since the systems reached the equilibrium, unlike some other adsorbents previously reported in literature [Wu Y, Zhang S, Guo X, Huang H. Adsorption of chromium(III) on lignin. Bioresource Technol.; 99, 16 (2008)7709-7715—incorporated herein by reference in its entirety].

Figure 5:
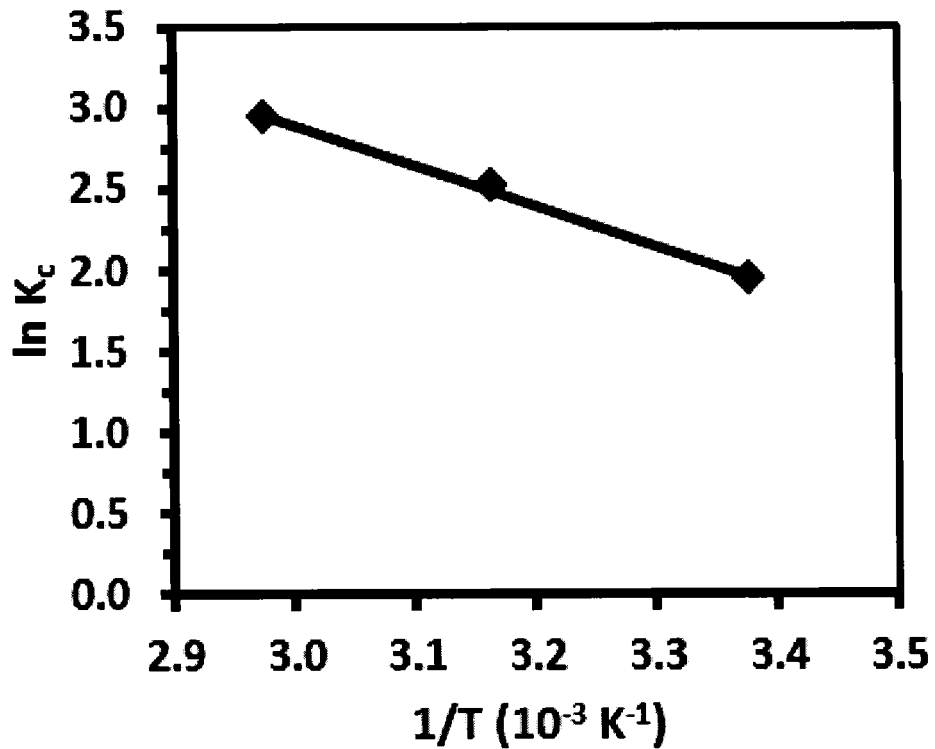
FIG. 5 is a plot of ln $K_c$ versus 1/T for Cr(III) adsorption on resin 106.

The thermodynamic parameters $\Delta G°$ (standard free energy), $\Delta H°$ (enthalpy change) and $\Delta S°$ (entropy change) were calculated to determine the nature of adsorption. The experimental data obtained at different temperatures were used to calculate the thermodynamic parameters by a plot of ln $K_c$ versus 1/T, FIG. 5, by using the linear Van't Hoff equation below (Equation 4):

$$\ln K_c = \frac{\Delta S^0}{R} - \frac{\Delta H^0}{RT} \qquad (4)$$

The $\Delta G°$ (free energy change) was calculated using the following Equation 5:

$$\Delta G° = \Delta H° - T\Delta S° \qquad (5)$$

where the gas constant R=8.314 kJ/mol·K, absolute temperature T in K, and $K_c = q_e/C_e$ (L/mg), standard thermodynamic equilibrium constant.

Referring to Table 2, the decrease in $\Delta G°$ value with increasing temperature indicates that adsorption of the ion on the adsorbent becomes favorable at higher temperature. The positive standard enthalpy change $\Delta H°$ of 23.2 kJ/mol suggests the adsorption of Cr(III) by the polymer is endothermic that is supported by the increasing adsorption of Cr(III) with the temperature increase.

TABLE 2

Thermodynamic parameters for the adsorption of Cr(III) on polymer at different temperatures.

| T (K) | $\Delta G°$ (kJ/mol) | $\Delta H°$ (kJ/mol) | $\Delta S°$ (kJ/mol·K) |
|---|---|---|---|
| 296 | −2.52 | 23.2 | 8.6 |
| 316 | −2.69 | | |
| 336 | −2.86 | | |

The activation energy of adsorption, $E_a$ (kJ/mol), is computed from the second order rate constant ($k_2$) obtained from the pseudo-second-order kinetic model using the Arrhenius equation below (Equation 6):

$$\ln(k) = \frac{-E_a}{R}\frac{1}{T} + \ln(A) \qquad (6)$$

where the second order rate constant k is in g/mg·h, R is the gas constant (8.314 J/mol·K) and T is the solution temperature (K). The magnitude of $E_a$ gives an indication of a type of adsorption: physical or chemical process. Physisorption process is readily reversible, equilibrium attained rapidly and thus energy requirements are small, ranging between 5 and 40 kJ/mol. Chemisorption mechanism is specific and involves stronger forces and, thus, requires large activation energy ranging from 40 to 800 kJ/mol [S. Khan, R. Reham, M. Khan, Adsorption of Cr(III), Cr(VI) and Ag(I) on bentonite, Waste Manage. 15 (1995) 271-282; D. Ghosh, K. Bhattacharyya, Adsorption of methylene blue on kaolinite, Appl. Clay Sci. 20 (2002) 295-300—each incorporated herein by reference in its entirety].

The experimental data of the effect of contact time at various temperatures (296, 316 and 336 K) were used assuming pseudo second-order kinetics. The k values at the three temperatures were calculated from the slopes of $t/q_t$ against t at 296, 316 and 336 K. The Arrhenius plot of ln k against 1/T for the adsorption of Cr(III) adsorption on the polymers 105 and 106 was generated. The slope of the plot was used to determine the activation energy as per the Arrhenius equation. The calculated value of apparent activation energy $E_a$ was 15.8 kJ/mol assuming the adsorption has a low potential barrier and assigned most likely to a physical sorption.

Figure 6:
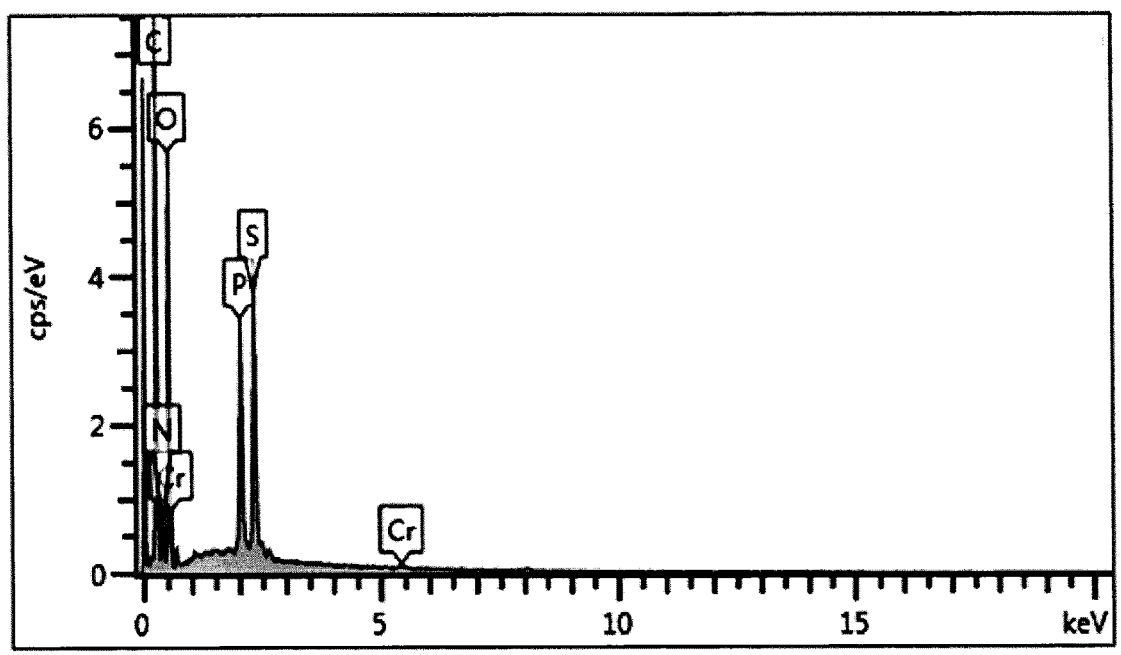
FIG. 6 shows an EDX spectrum of chromium-loaded resin 106.

Energy dispersive X-ray (EDX) analysis was performed for examining the surface morphology and the structure of the polymer before and after the adsorption. As shown in FIG. 6, the EDX spectrum recorded for chromium-loaded polymer adsorption indicates the characteristic peaks for Cr(III) at 5.4 and 0.57 keV in addition to the peaks of the other elements of the polymer structure. This confirms the binding of Cr(III) to the surface of the polymer. Tables 3 and 4 indicate the apparent concentration and the element weight percents for all the elements present in the loaded and unloaded polymer.

TABLE 3

EDX quantitative microanalysis of resin 106.

| Element | Line Type | Apparent Concentration | k Ratio | Wt % | Wt % Sigma |
|---|---|---|---|---|---|
| C | K series | 39.94 | 0.39936 | 60.97 | 0.35 |
| O | K series | 30.42 | 0.10236 | 24.27 | 0.32 |

TABLE 3-continued

EDX quantitative microanalysis of resin 106.

| Element | Line Type | Apparent Concentration | k Ratio | Wt % | Wt % Sigma |
|---|---|---|---|---|---|
| Na | K series | 22.08 | 0.09320 | 8.61 | 0.12 |
| P | K series | 9.35 | 0.05229 | 2.35 | 0.05 |
| S | K series | 10.15 | 0.08744 | 3.67 | 0.06 |
| Cl | K series | 0.35 | 0.00307 | 0.13 | 0.02 |
| Total: | | | | 100.00 | |

TABLE 4

EDX quantitative microanalysis of Cr(III) loaded resin 106.

| Element | Line Type | Apparent Concentration | k Ratio | Wt % | Wt % Sigma |
|---|---|---|---|---|---|
| C | K series | 55.34 | 0.55343 | 55.97 | 0.44 |
| N | K series | 15.02 | 0.02674 | 9.97 | 0.56 |
| O | K series | 38.64 | 0.13003 | 28.24 | 0.32 |
| P | K series | 13.24 | 0.07406 | 2.63 | 0.04 |
| S | K series | 10.56 | 0.09099 | 3.07 | 0.05 |
| Cr | K series | 0.34 | 0.00341 | 0.12 | 0.03 |
| Total: | | | | 100.00 | |

Table 5 compares the Cr(III) maximum adsorption capacity of the resin 106 to the Cr(III) maximum adsorption capacities of various reported adsorbents. All references cited in Table 5 are incorporated by reference in their entireties.

TABLE 5

Cr(III) maximum adsorption capacities of various adsorbents.

| Adsorbents | Capacity (mg/g) | Reference |
|---|---|---|
| Ion-exchange resin | 20.28 | Gode, F., Pehlivan, E., 2006. Removal of chromium(III) from aqueous solutions using Lewatit S 100: The effect of pH, time, metal concentration and temperature. J. Hazard. Mater. 136, 330-337. |
| Lignin | 17.97 | Yun Wu, Shuzhen Zhang, Xueyan Guo, Honglin Huang, Adsorption of chromium(III) on lignin, Bioresource Technology 99 (2008) 7709-7715. |
| Modified peanut husk | 7.67 | Li, Q., Zhai, J., Zhang, W., Wan, M., Zhou, J., 2007. Kinetic studies of adsorption of Pb(II), Cr(III) and Cu(II) from aqueous solution by sawdust and modified peanut husk. J. Hazard. Mater. 141, 163-167. |
| Peanut straw char | 0.48 | Jingjian Pan, Jun Jiang, Renkou Xu, Adsorption of Cr(III) from acidic solutions by crop straw derived biochars, Journal of Environmental Sciences 2013, 25(10) 1957-1965. |
| Cyphos IL104 functionalized silica | 2.14 | Y.H. Liu, L. Guo, J. Chen, Removal of Cr(III, VI) by quaternary ammonium and quaternary phosphonium ionic liquids functionalized silica materials, Chem. Eng. J. 158 (2010) 108-114. |
| Sawdust grafted poly (methacrylic acid) | 36.63 | T.S. Anirudhan, P.G. Radhakrishnan, Chromium (III) removal from water and wastewater using a carboxylate-functionalized cation exchanger prepared from a lignocellulosic residue, J. Colloid Interf. Sci. 316 (2007) 268-276. |
| Alumina adsorbent functionalized-purpurogallin | 29.64 | M.E. Mahmouda, O.F. Hafez, M.M. Osman, et al., Hybrid inorganic/organic alumina adsorbents-functionalized-purpurogallin for removal and preconcentration of Cr(III), Fe(III), Cu(II), Cd(II) and Pb(II) from underground water, J. Hazard. Mater. 176 (2010) 906-912. |
| Tartrazine modified activated carbon | 16.9 | L. Monser, N. Adhoum, Tartrazine modified activated carbon for the removal of Pb(II), Cd(II) and Cr(III), J. Hazard. Mater. 161 (2009) 263-269. |
| Tris(2-aminoethyl) amine functionalized silica | 32.7 | X.P. Huang, X.J. Chang, Q. He, et al., Tris(2-aminoethyl) amine functionalized silica gel for solid-phase extraction and preconcentration of Cr(III), Cd(II) and Pb(II) from waters, J. Hazard. Mater. 157 (2008) 154-160. |
| Resin 106 | 48.5 | The present invention. |

The Cr(III) maximum adsorption capacity of resin 106 was calculated using the Langmuir, Freundlich and Temkin isotherm models expressed as the following Equations 7, 8 and 9, respectively:

Langmuir Equation:

$$\frac{C_e}{q_e} = \frac{C_e}{Q_m} + \frac{1}{Q_m b} \quad (7)$$

where $q_e$ and $C_e$ are the adsorption capacity at equilibrium (mg g$^{-1}$) and concentration of metal ions at equilibrium (mg L$^{-1}$), respectively, $Q_m$ is the maximum adsorption capacity of metal ions on the adsorbent (mg g$^{-1}$) and b is the Langmuir constant related to the adsorption energy (L mg$^1$).

Freundlich Equation:

$$q_e = K_f C_e^{\frac{1}{n}} \quad (8)$$

where $K_f$(mg/g) is the Freundlich isotherm constant indicating adsorption capacity and n is the adsorption intensity while 1/n is a function of the strength of the adsorption, $C_e$ is the equilibrium concentration of adsorbate (mg/L) and $q_e$ is the amount of adsorbate per adsorbent at equilibrium (mg/g).

Temkin Equation:

$$q_e = \frac{RT}{b_T} \ln K_T + \frac{RT}{b_T} \ln C_e \quad (9)$$

where $b_T$ is the Temkin isotherm constant related to the heat of sorption (joule per mole), $k_T$ is the Temkin isotherm equilibrium binding constant (L/g) which is equal to the maximum binding energy (L/g), R is gas constant (8.314× 10$^{-3}$ kJ/mol·K) and T is the absolute temperature (degrees Kelvin).

Figure 7A:
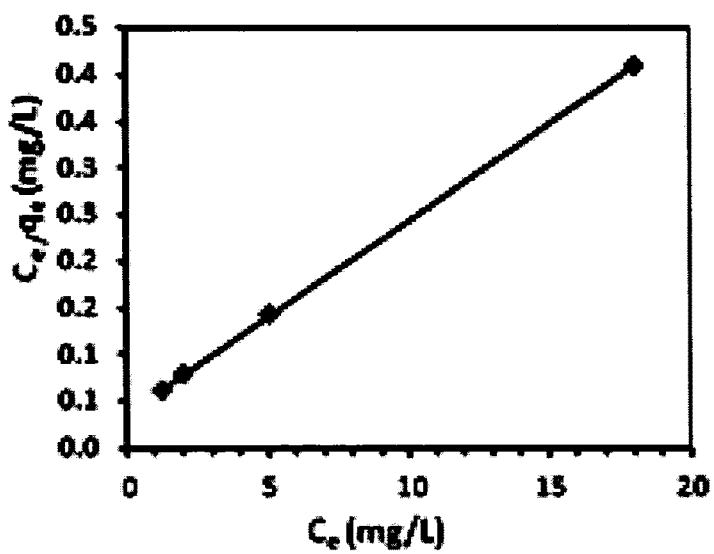
FIG. 7A is a Langmuir adsorption isotherm plot for Cr(III) adsorption on the resin 106 at an initial concentration of 40 ppm and at different resin dosages ranging from 1-20 mg/L.
Figure 7B:
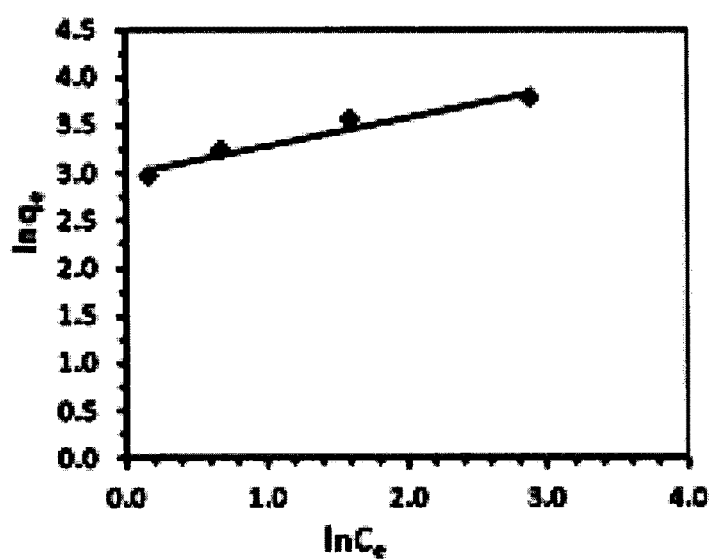
FIG. 7B is a Freundlich adsorption isotherm plot for Cr(III) adsorption on the resin 106 at an initial concentration of 40 ppm and at different resin dosages ranging from 1-20 mg/L.
Figure 7C:
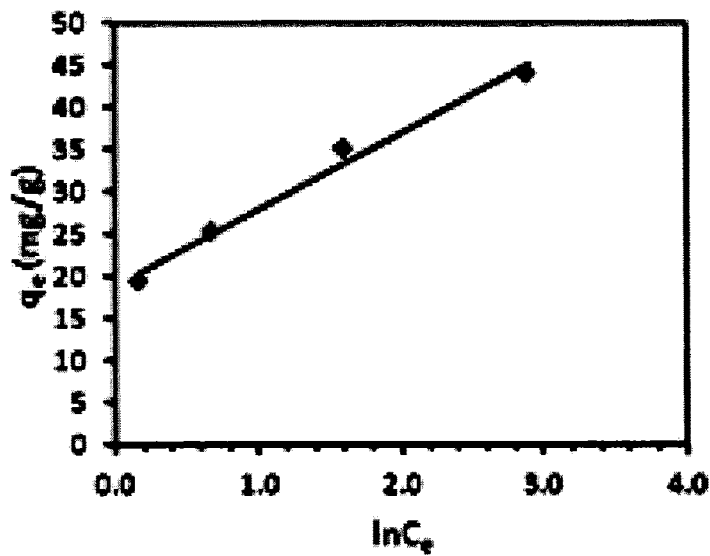
FIG. 7C is a Temkin adsorption isotherm plot for Cr(III) adsorption on the resin 106 at an initial concentration of 40 ppm and at different resin dosages ranging from 1-20 mg/L.

The Langmuir, Freundlich and Temkin adsorption isotherm plots for Cr(III) adsorption on the resin 106 at an initial concentration of 40 ppm and at different resin dosages ranging from 1-20 mg/L are shown in FIGS. 7A, 7B and 7C, respectively and the calculated values for the various parameters for the isotherm models are presented in Table 6.

TABLE 6

Langmuir, Freundlich and Temkin isotherms constants for Cr(III) adsorption on resin 106.

| Langmuir isotherm | | | | Freundlich isotherm | | | | Temkin isotherm | | |
|---|---|---|---|---|---|---|---|---|---|---|
| $q_m$ (mg/g) | $k_L$ (L/mg) | $R_L$ | $R^2$ | $1/n$ | $n$ | $k_f$ (mg/g) | $R^2$ | $K_T$ (L/g) | $b_T$ (KJ/mol) | $R^2$ |
| 48.5 | 0.542 | 0.0442 | 0.9934 | 0.301 | 3.39 | 19.8 | 0.9548 | 7.957 | 0.274 | 0.9887 |

EXAMPLE 5

Regenerability and Reusability of Resin 106

The chromium-loaded resin 106 was mixed and stirred with $HNO_3$ (1 M) at room temperature for 120 min desorb the chromium. The resin was washed with deionized water and allowed to dry and then again reused for the adsorption of Cr(III). The adsorption and desorption procedure were repeated several times.

Regenerability and reusability of an adsorbent is important in economic development because disposal of the exhausted sorbent loaded with the adsorbates may cause environmental impact. Thus, regeneration procedures typically utilize a small volume of desorbing agent with a concentration suitable for adsorbate recovery without damaging the adsorbent capacities. Therefore, to obtain the reusability of the resin or polymer, the adsorption followed by desorption cycles were repeated 5 times with the same dose. The resin 106 showed good recovery with approximately stable efficiency.

EXAMPLE 6

Treatment of Real Waste Samples

A sample of industrial wastewater was used to study the effect of real water matrix and to evaluate practical application of the resin 106. The samples were spiked with 0.0, 10.0 and 20 mg/L Cr(III), and then treated with the resin. The results given in Table 7 indicate that the removal efficiencies of Cr(III) are hardly influenced by the real wastewater matrix. This indicates the high efficiency and capability of polymer to be regarded as a potential adsorbent for high efficient and renewable adsorbent for Cr(III) ions from aqueous solutions.

TABLE 7

Comparison of concentrations of Cr(III) in wastewater sample before and after the treatment with the resin 106.

| Metal | Original sample ($\mu g\ L^{-1}$) | After treatment ($\mu g\ L^{-1}$) | | |
|---|---|---|---|---|
| | | 0 | Original sample spiked with Cr(III) and then treated with the adsorbent | |
| | | | 10000 ($\mu g\ L^{-1}$) | 20000 ($\mu g\ L^{-1}$) |
| Cr | 3.51 | <MDL | 0.42 | 2.27 |
| Co | 0.362 | <MDL | <MDL | <MDL |
| Cu | 22.14 | 1.80 | 1.82 | 1.14 |
| Zn | 9.14 | 0.019 | 0.233 | 1.61 |
| As | 8.14 | <MDL | <MDL | <MDL |
| Sb | 0.037 | <MDL | <MDL | <MDL |
| Pb | 0.453 | <MDL | <MDL | <MDL |

MDL: the method detection limit

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A cross-linked tetrapolymer comprising a repeating unit of four zwitterionic diallyl quaternary ammonium salt monomers having one of the following Formulas 1 or 2:

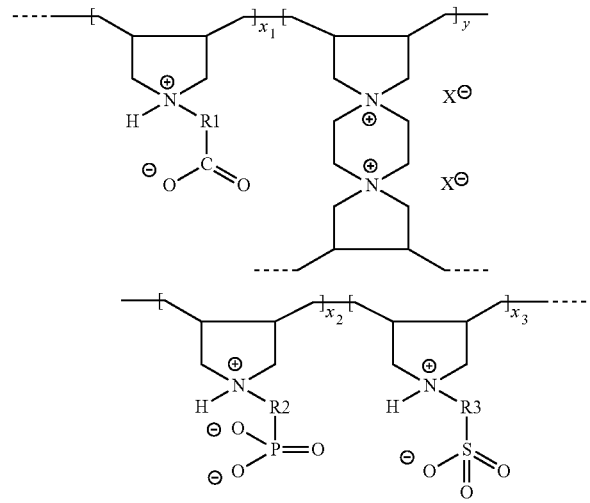

(Formula 1)

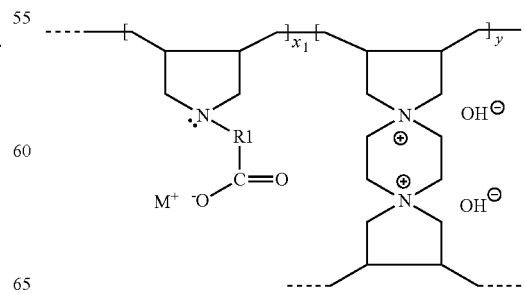

(Formula 2)

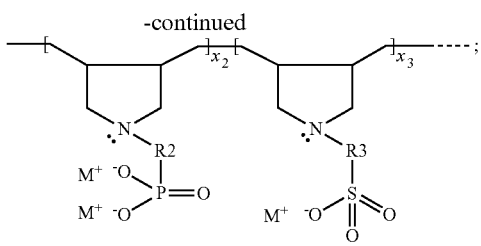

wherein X is F, Cl, Br, I, $NO_3$ or other suitable anion; M is Li, Na, K or other suitable cation; R1, R2 and R3 are independently substituted or unsubstituted alkyl or aryl groups having 1-6 carbon atoms;

wherein the four monomers are present in the tetrapolymer at a molar ratio of $x_1:x_2:x_3:y$; $x_1$, $x_2$ and $x_3$ are each 30-32, y is 4-10 and wherein the repeating unit comprises a plurality of ligand centers and one of the four monomers is a cross-linking monomer.

2. The cross-linked tetrapolymer of claim 1, wherein the tetrapolymer is one of cationic, zwitterionic and anionic.

3. The cross-linked tetrapolymer of claim 1, wherein the tetrapolymer is in an acidic form or a basic form.

4. The cross-linked tetrapolymer of claim 1, wherein the repeating unit comprises at least 7 ligand centers.

5. The cross-linked tetrapolymer of claim 1, wherein the four monomers are present in the tetrapolymer at a molar ratio of 31:31:31:7;

wherein the monomer having the lower number of moles is the cross-linking monomer.

6. The cross-linked tetrapolymer of claim 1, wherein the four monomers are:
4-(diallylammonio)butanoate;
N-allyl-N-(3-phosphonopropyl)prop-2-en-1-aminum chloride;
methylene 3-(diallylammonio)propane-1-sulfinate; and
1,1,4,4-tetrallylpiperazine-1,4-dium chloride;
wherein 1,1,4,4-tetrallylpiperazine-1,4-dium chloride is the cross-linking monomer.

7. The cross-linked tetrapolymer of claim 1, wherein the tetrapolymer is prepared by heating a solution comprising the four zwitterionic diallyl quaternary ammonium salt monomers at a molar ratio of $x_1:x_2:x_3:y$ and ammonium persulfate to 80-100° C. under an inert atmosphere;

wherein $x_1$, $x_2$ and $x_3$ are each 30-32, y is 4-10 and the monomer having the lower number of moles is the cross-linking monomer.

8. A method of removing Cr(III) ions from an aqueous solution, comprising:
contacting the aqueous solution with an adsorbent comprising the cross-linked tetrapolymer of claim 1.

9. The method of claim 8, wherein the Cr(III) ions have an initial concentration range of 5-500 ppm.

10. The method of claim 8, wherein the cross-linked tetrapolymer is present in a concentration range of 0.02-0.1 g $L^{-1}$ per total volume of the aqueous solution.

11. The method of claim 8, wherein the contacting is carried out at a temperature of 20-65° C.

12. The method of claim 8, wherein the contacting is carried out at pH 4-7.

13. The method of claim 8, wherein the contacting is carried out for 10-120 min.

14. The method of claim 8, wherein the cross-linked tetrapolymer has a Cr(III) maximum adsorption capacity of 45-55 mg $g^{-1}$ based on the total weight of the cross-linked tetrapolymer.

15. The method of claim 8, wherein the contacting removes at least 85% of the Cr(III) ions present in the aqueous solution.

16. The method of claim 8, wherein after contacting, one or more Cr(III) ions are coordinated to the ligand centers of the cross-linked tetrapolymer.

17. The method of claim 8, wherein the method is in a batch mode.

18. The method of claim 8, further comprising: desorbing the Cr(III) from the adsorbent to regenerate the adsorbent for Cr(III) removal.

* * * * *